US012670835B2

(12) United States Patent
Lin et al.

(10) Patent No.: US 12,670,835 B2
(45) Date of Patent: Jun. 30, 2026

(54) MODULATING DEVICE INCLUDING TWO SCAN LINES THAT TRANSMIT A FIRST SCANNING SIGNAL TO SWITCHES OF TWO ROWS

(71) Applicant: Innolux Corporation, Miaoli County (TW)

(72) Inventors: Yi-Hung Lin, Miaoli County (TW); Chih-Yung Hsieh, Miaoli County (TW); Hsiu-Yi Tsai, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 19/060,771

(22) Filed: Feb. 23, 2025

(65) Prior Publication Data

US 2025/0191521 A1 Jun. 12, 2025

Related U.S. Application Data

(63) Continuation of application No. 18/304,337, filed on Apr. 20, 2023, now abandoned.

(60) Provisional application No. 63/347,025, filed on May 31, 2022.

(30) Foreign Application Priority Data

Mar. 2, 2023 (CN) ......................... 202310191905.0

(51) Int. Cl.
*G09G 3/20* (2006.01)

(52) U.S. Cl.
CPC ... *G09G 3/2092* (2013.01); *G09G 2300/0426* (2013.01); *G09G 2300/0809* (2013.01); *G09G 2310/0248* (2013.01); *G09G 2310/08* (2013.01)

(58) Field of Classification Search
None
See application file for complete search history.

(56) References Cited

U.S. PATENT DOCUMENTS 11,069,292 B1 * 7/2021 Heganovic ........... G09G 3/3233
2006/0103800 A1 * 5/2006 Li ......................... G02F 1/1393 349/129
2008/0129652 A1 6/2008 Park
(Continued)

OTHER PUBLICATIONS

"Office Action of European counterpart Application", issued on Oct. 2, 2025, p. 1-p. 11.

*Primary Examiner* — Kirk W Hermann
(74) *Attorney, Agent, or Firm* — JCIPRNET

(57) ABSTRACT

A modulating device includes multiple modulators, multiple switches, and a driving circuit. The driving circuit drives switches of more than two rows among the switches within a time period. Each of the modulators comprises a pixel circuit and a working element. The pixel circuit is electrically connected to the working element. The working element is one of a varactor and a variable resistor. The modulating device further comprises a plurality of scan lines connecting to the driving circuit. A first scan line and a second scan line transmit a first scanning signal to switches of two rows among the switches. The first scan line and the second scan line which transmit the same first scanning signal are separated by a plurality of third scan lines, and the plurality of third scan lines receive a plurality of scanning signals respectively different from the first scanning signal.

8 Claims, 11 Drawing Sheets

(56) References Cited

U.S. PATENT DOCUMENTS

| | | | | |
|---|---|---|---|---|
| 2009/0091557 | A1* | 4/2009 | Tsai | G09G 3/3648 345/204 |
| 2009/0284674 | A1* | 11/2009 | Chang | G02F 1/1368 349/38 |
| 2010/0134743 | A1* | 6/2010 | Shin | G02F 1/136286 349/150 |
| 2011/0241526 | A1* | 10/2011 | Huang | G09G 3/3648 313/307 |
| 2011/0267323 | A1* | 11/2011 | Fujikawa | G09G 3/3648 345/206 |
| 2016/0125793 | A1* | 5/2016 | Kim | G09G 3/3648 345/213 |
| 2016/0190065 | A1 | 6/2016 | Liaw et al. | |
| 2018/0240421 | A1* | 8/2018 | Yamazaki | G09G 3/3614 |
| 2018/0252971 | A1* | 9/2018 | Irie | G09G 3/3677 |
| 2019/0295482 | A1* | 9/2019 | Sasaki | G09G 3/3607 |
| 2020/0020263 | A1* | 1/2020 | Shin | H10K 59/131 |
| 2020/0333674 | A1* | 10/2020 | Zhao | G02F 1/13394 |

* cited by examiner

MODULATING DEVICE INCLUDING TWO SCAN LINES THAT TRANSMIT A FIRST SCANNING SIGNAL TO SWITCHES OF TWO ROWS

CROSS-REFERENCE TO RELATED APPLICATION

This application is a continuation application of and claims the priority benefit of a prior application Ser. No. 18/304,337, filed on Apr. 20, 2023, which claims the priority benefit of U.S. provisional application Ser. No. 63/347,025, filed on May 31, 2022, and China application serial no. 202310191905.0, filed on Mar. 2, 2023. The entirety of each of the above-mentioned patent applications is hereby incorporated by reference herein and made a part of this specification.

BACKGROUND

Technical Field

The disclosure relates to an electronic device, and more particularly, to a modulating device.

Description of Related Art

With the increase in the operation frequency of electronic devices, the performance of electronic devices can be enhanced. To increase the operation frequency, the frame time of the modulating device (e.g., antenna array) has to be shortened. The time length of the frame time is positively correlated with the charging time of the signal channel (e.g., scan line). Thus, the charging time of the signal channel of the modulating device also has to be shortened. The charging time of the signal channel may not insufficient. The current way of improvement is to reduce the resistance of the signal channel and the capacitance of the modulating device to accelerate the charging of the signal channel. However, this method requires significant modification to the design and process of the modulating device, thereby increasing the design cost and manufacturing cost of the modulating device.

SUMMARY

The disclosure is related to a modulating device with a short frame time.

According to the embodiments of the disclosure, the modulating device includes a substrate, multiple modulators, multiple switches, and a driving circuit. The modulators are disposed on the substrate. The switches are disposed on the substrate. Each of the modulators corresponds to each of the switches. The driving circuit is disposed on the substrate. The driving circuit drives the switches. The driving circuit drives switches of more than two rows among the switches within a time period. Each of the modulators comprises a pixel circuit and a working element. The pixel circuit is electrically connected to the working element. The working element is one of a varactor and a variable resistor. The modulating device further comprises a plurality of scan lines connecting to the driving circuit, and the plurality of scan lines comprise a first scan line, a second scan line, and a plurality of third scan lines. The first scan line and the second scan line transmit a first scanning signal to switches of two rows among the switches. The first scan line and the second scan line which transmit the same first scanning signal are separated by the plurality of third scan lines, and the plurality of third scan lines receive a plurality of scanning signals respectively different from the first scanning signal.

Based on the above, the driving circuit of the modulating device of the disclosure drives switches of more than two rows within a time period. It should be noted that under the short frame time operation, the charging time of the signal channel of the modulating device may be extended at least by 2 times. In this way, the charging of the signal channel does not need to be accelerated. The design and process of the modulating device do not need to be substantially modified.

DESCRIPTION OF THE EMBODIMENTS

Figure 1:
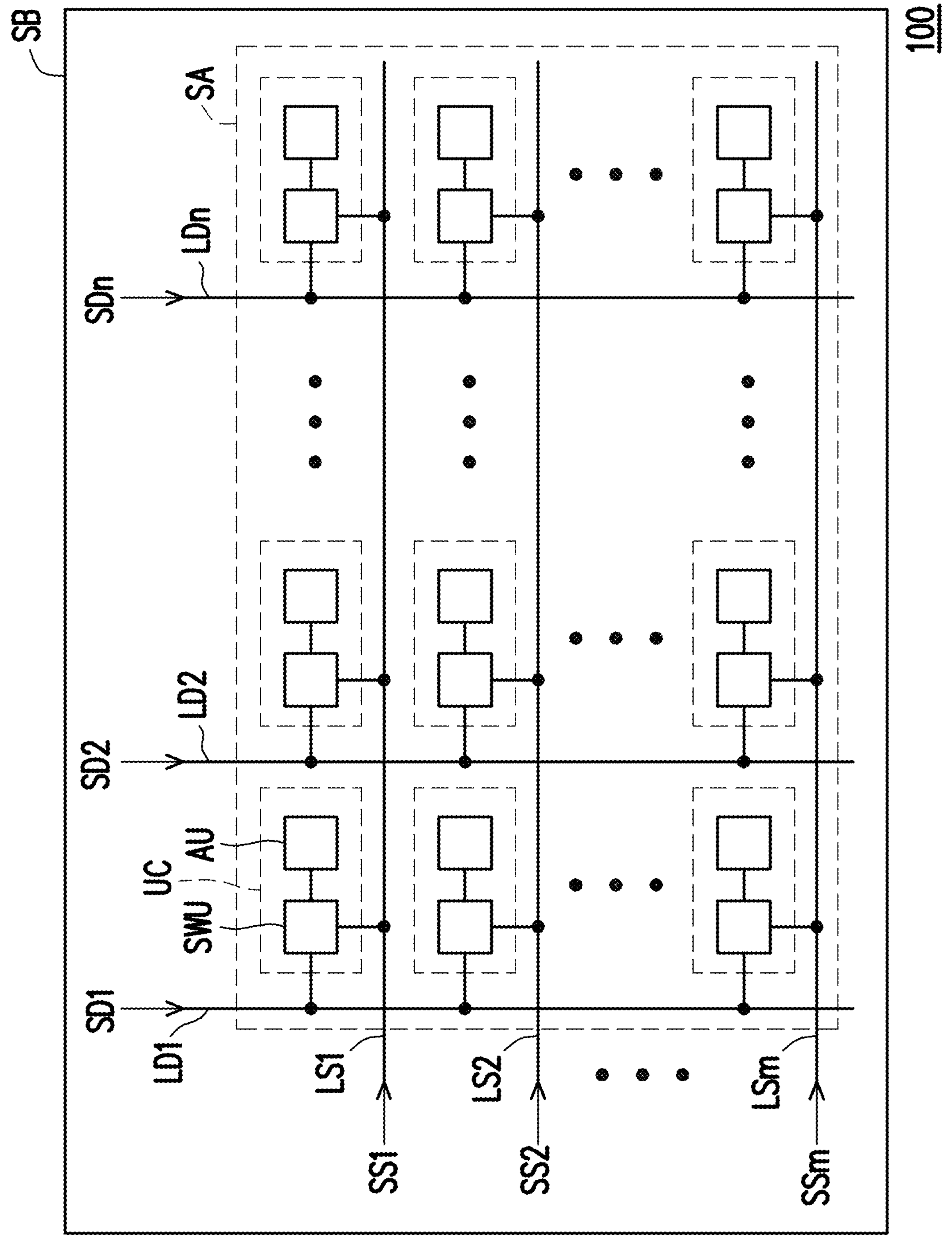
FIG. 1 is a schematic diagram of a modulating device according to the first embodiment of the disclosure.

The disclosure can be understood by referring to the following detailed description in combination with the accompanying drawings. It should be noted that, for purposes of clarity and easy understanding by readers, each drawing of the disclosure depicts a portion of an electronic device, and some elements in each drawing may not be drawn to scale. In addition, the number and size of each component in the drawings are only for exemplary purpose, and are not intended to limit the scope of the disclosure.

Certain terms are used throughout the description and the following claims to refer to specific components. As will be understood by those skilled in the art, electronic device manufacturers may refer to components by different names. The disclosure does not intend to distinguish between components that differ by name but not function. In the following description and in the claims, the terms "comprising," "including," and "having" are used in an open-ended fashion, and should therefore be interpreted to mean "including but not limited to . . . ". When the terms "comprising", "including" and/or "having" are used in the description of the disclosure, it will indicate the existence of corresponding features, regions, steps, operations and/or components, but not limited to the existence of one or more corresponding features, regions, steps, operations and/or components.

It will be understood that when a component is referred to as being "coupled", "connected" or "conducting" with another component, the component may be directly connected to the other component and an electrical connection may be made directly, or there may be intermediate components between these components for relaying electrical connections (indirect electrical connections). In contrast, when a component is referred to as being "directly coupled," "directly conducting," or "directly connected" to another component, there are no intermediate components present.

Although the terms "first", "second", "third" . . . may be used to describe various constituent components, the constituent components are not limited by the terms. The terms are used to distinguish a constituent element from other constituent elements in the specification. The claims may not use the same terms, but may use the terms first, second, third, etc. with respect to the required order of the elements. Therefore, in the following description, a first constituent element may be a second constituent element in the claims.

The electronic device of the disclosure may include a display device, an antenna device, a sensing device, a light emitting device, a touch display device, a curved display device, or a free shape display device, but not limited thereto. The electronic device may include a bendable or a flexible electronic device. The electronic device may include, for example, liquid crystal, light emitting diodes (LEDs), quantum dots (QDs), fluorescence, phosphor, other suitable display media, or a combination of the above materials, but not limited thereto. The light emitting diode may include, for example, organic light emitting diodes (OLEDs), mini LEDs, micro LEDs, or quantum dot LEDs (which may include QLEDs and QDLEDs), other suitable materials, or a combination of the above materials, but not limited thereto. The display device may include, for example, but not limited to, a spliced display device. The antenna device may be, for example, a liquid crystal antenna, but not limited thereto. The antenna device may include, for example, an antenna splicing device, but not limited thereto. It should be noted that, the electronic device can be any arrangement and combination of the foregoing, but not limited thereto. In addition, the shape of the electronic device may be rectangular, circular, polygonal, a shape with curved edges, or other suitable shapes. The electronic device may have peripheral systems such as a driving system, a control system, a light source system, etc. to support a display device, an antenna device, or a splicing device, but the disclosure is not limited thereto. The sensing device may include a camera, an infrared sensor, a fingerprint sensor, etc., and the disclosure is not limited thereto. In some embodiments, the sensing device may also include a flashlight, an infrared (IR) light source, other sensors, electronic elements, or a combination of the above, but not limited thereto.

In the disclosure, the embodiment uses "pixel" or "pixel unit" as a unit for describing a specific region including at least one functional circuit for at least one specific function. The region of "pixel" depends on the unit used to provide a specific function. Adjacent pixels may share the same portion or the conducting wire, a specific part thereof may also be included. For example, adjacent pixels may share the same scan line or the same data line, but a pixel may also have its own transistor or capacitor.

It should be noted that technical features in different embodiments described below may be replaced, recombined or mixed with each other to constitute another embodiment without departing from the spirit of the disclosure.

FIG. 1 is a schematic diagram of a modulating device according to the first embodiment of the disclosure, referring to FIG. 1, in this embodiment, a modulating device 100 includes a substrate SB, multiple modulators AU, and multiple switches SWU. The modulators AU are disposed on the substrate SB. The switches SWU are disposed on the substrate SB. Each of the modulators AU corresponds to each of the switches SWU. In other words, the modulator AU and the switch SWU are connected in a one-to-one manner. Each of the switches SWU and a corresponding modulator AU may form a unit circuit UC. The unit circuit UC is arranged in an active area SA in multiple rows and columns.

In this embodiment, the substrate SB may include a rigid substrate or a flexible substrate. The material of the substrate SB may include glass, silicon, sapphire, plastic, polymer, other suitable materials or combinations thereof. In this embodiment, the substrate SB may have an electrical connection structure.

In this embodiment, the modulating device 100 further includes scan lines LS1~LSm and data lines LD1~LDn. The scan lines LS1~LSm and the data lines LD1~LDn are disposed in the substrate SB. The first row of the unit circuit UC is connected to the scan line LS1 to receive a scanning signal SS1. The second row of the unit circuit UC is connected to the scan line LS2 to receive a scanning signal SS2. Similarly, the $m^{th}$ row of the unit circuit UC is connected to the scan line LSm to receive a scanning signal SSm. The first column of the unit circuit UC is connected to the data line LD1 to receive a data signal SD1. The second column of the unit circuit UC is connected to the data line LD2 to receive a data signal SD2. Similarly, the $n^{th}$ column of the unit circuit UC is connected to the data line LDn to receive a data signal SDn. For example, in a first time period, the first row of the unit circuit UC operates the corresponding modulator AU by using the received data signal according to the scanning signal SS1. In a second time period, the second row of the unit circuit UC operates the corresponding modulator AU by using the received data signal according to the scanning signal SS2, and so on.

In this embodiment, "m" is an integer greater than 1. "n" is an integer greater than or equal to "m". An amount of the data lines LD1~LDn is 1 to 10 times an amount of the scan lines LS1~LSm (i.e., n:m=1~10). Thus, the amount of the scan lines LS1~LSm is less than or equal to the amount of the data lines LD1~LDn. By reducing the amount of the scan lines LS1~LSm, the charging time of the scan lines LS1~LSm may be prolonged under a short frame time operation. For example, the amount of the scan lines LS1~LSm is reduced from 100 to 50. Based on a fixed amount of the unit circuit UC, the amount of the data lines LD1~LDn is increased correspondingly. Thus, the charging time of the scan lines LS1~LSm may be extended by 2 times. In this way, the charging of the scan lines LS1~LSm does not need to be accelerated.

In some embodiments, the switch SWU coupled to the same scan line in the scan lines LS1~LSm may be disposed in different rows. For example, an odd column switch SWU coupled to the scan line LS1 is located in the first row. An even column switch SWU coupled to the scan line LS1 is located in the second row, and the disclosure is not limited thereto.

Extension directions of any two of the scan lines LS1~LSm may be parallel to each other or non-parallel to each other. Extension directions of any two of the data lines LD1~LDn may be parallel to each other or non-parallel to each other.

Figure 2:
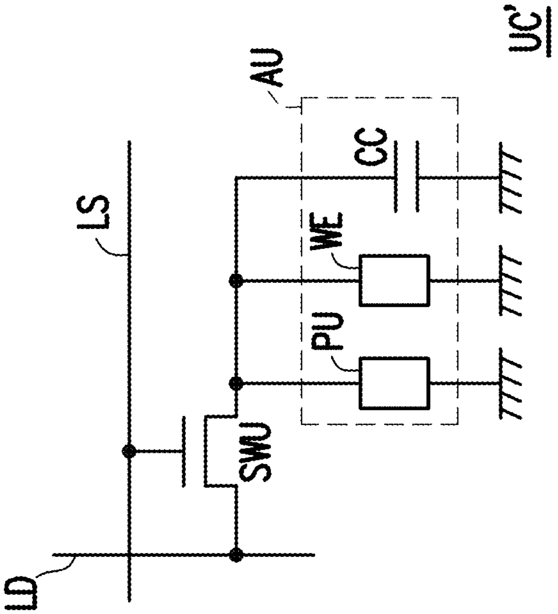
FIG. 2 is a schematic diagram of a unit circuit according to an embodiment of the disclosure.

FIG. 2 is a schematic diagram of a unit circuit according to an embodiment of the disclosure, refer to FIG. 1 and FIG. 2 at the same time, in this embodiment, the unit circuit UC in FIG. 1 may be implemented by the unit circuit UC' shown in FIG. 2. The unit circuit UC' includes a modulator AU and a switch SWU. The modulator AU includes a pixel circuit PU and a working element WE. The pixel circuit PU is electrically connected to the working element WE. Taking this embodiment as an example, the switch SWU may be implemented by a transistor. A first end of the switch SWU is connected to a data line LD. A second end of the switch SWU is connected to the modulator AU. A control end of the switch SWU is connected to a scan line LS. The pixel circuit PU is connected to the second end of the switch SWU. The working element WE is connected to the second end of the switch SWU. The pixel circuit PU at least uses the data signal to control the working element WE. The pixel circuit PU includes, for example, at least one of an amplifier circuit, a compensation circuit, and a source follower circuit. The working element WE is, for example, a varactor, a transistor, a variable resistor, other suitable circuits, or a combination of the above, and the disclosure is not limited thereto.

In this embodiment, the modulator AU further includes a capacitor CC (the disclosure is not limited thereto). The capacitor CC is connected to the second end of the switch SWU.

Figure 3:
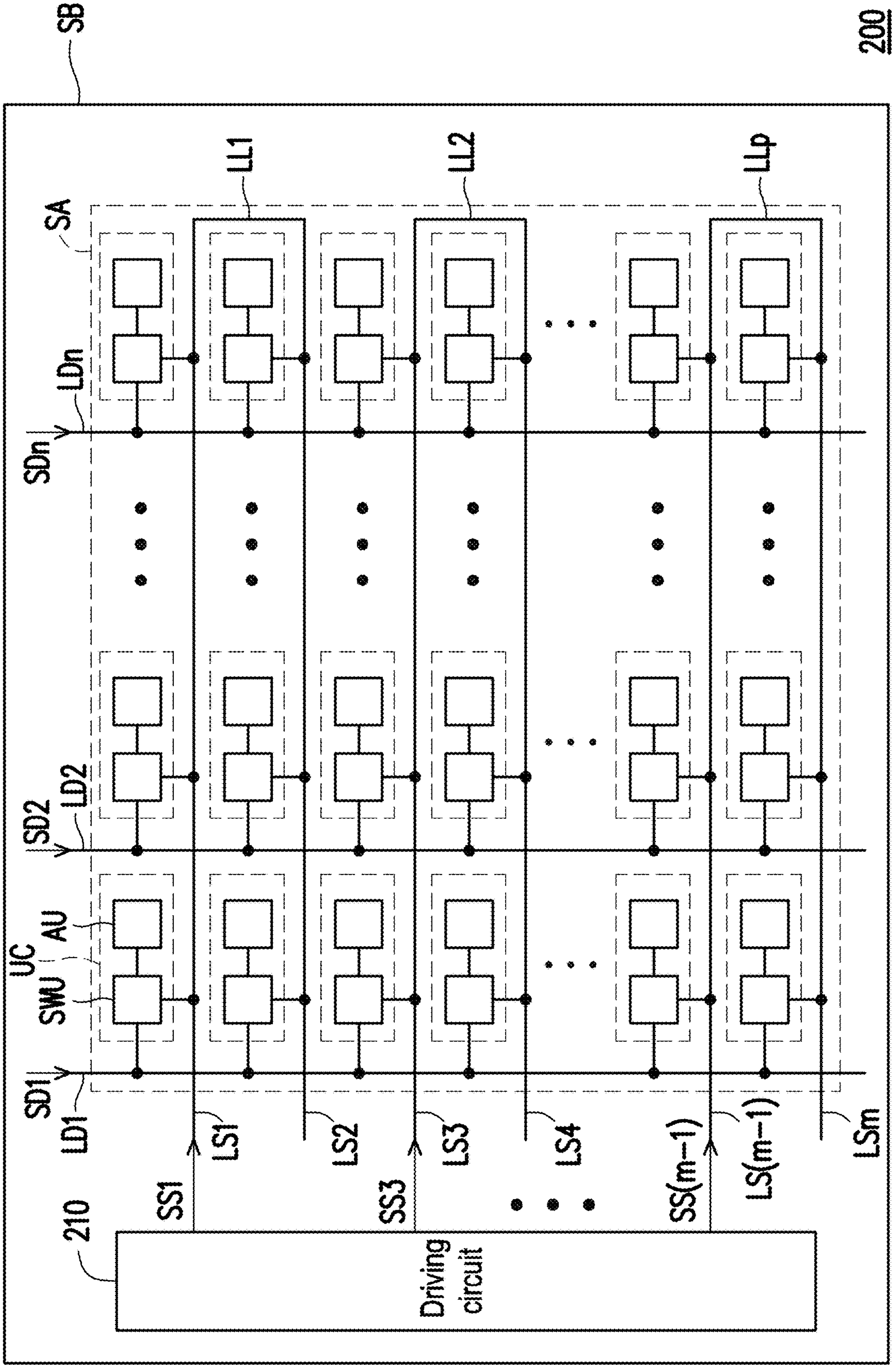
FIG. 3 is a schematic diagram of a modulating device according to the second embodiment of the disclosure.

FIG. 3 is a schematic diagram of a modulating device according to the second embodiment of the disclosure, referring to FIG. 3, in this embodiment, a modulating device 200 includes a substrate SB, multiple modulators AU, multiple switches SWU, and a driving circuit 210. The modulators AU are disposed on the substrate SB. The switches SWU are disposed on the substrate SB. Each of the modulators AU corresponds to each of the switches SWU. In other words, the modulator AU and the switch SWU are connected in a one-to-one manner. Each of the switches SWU and a corresponding modulator AU may form a unit circuit UC. The unit circuit UC is arranged in an active area SA in multiple rows and columns. In some embodiments, the unit circuit UC may be implemented by the unit circuit UC' shown in FIG. 2.

In this embodiment, the driving circuit 210 is disposed on the substrate SB. The driving circuit 210 drives the switches SWU. The driving circuit 210 drives switches of two rows among the switches SWU within a time period. In this embodiment, the driving circuit 210 may be implemented by a gate driving circuit or a shift register. In this embodiment, the driving circuit 210 is, for example, disposed outside the active area SA.

In this embodiment, the modulating device 200 further includes scan lines LS1~LSm, data lines LD1~LDn, and electrical connection structures LL1~LLp. The scan lines LS1~LSm, the data lines LD1~LDn, and the electrical connection structures LL1~LLp are disposed in the substrate SB. The first row of the unit circuit UC is connected to the scan line LS1 to receive a scanning signal SS1. The second row of the unit circuit UC is connected to the scan line LS2 to receive a scanning signal SS2, and so on. In this embodiment, two of the scan lines LS1~LSm provide scanning signals to the switches of more than two rows among the switches SWU. The first column of the unit circuit UC is connected to the data line LD1 to receive a data signal SD1. The second column of the unit circuit UC is connected to the data line LD2 to receive a data signal SD2. Similarly, the $n^{th}$ column of the unit circuit UC is connected to the data line LDn to receive a data signal SDn. In this embodiment, the data signals SD1~SDn may be respectively provided by a data driving circuit (not shown), but the disclosure is not limited thereto.

The driving circuit 210 is connected to scan lines LS1, LS3, . . . , LS(m−1). In this embodiment, "m" is an integer greater than 1. "n" is an integer greater than or equal to "m". An amount of the data lines LD1~LDn is 1 to 10 times an amount of the scan lines LS1~LSm (i.e., n:m=1~10). "p" is a positive integer less than "m". In this embodiment, the electrical connection structures LL1~LLp are disposed in the active area SA. In some embodiments, the electrical connection structures LL1~LLp are disposed outside the active area SA.

The scan line LS1 is connected to the scan line LS2 through the electrical connection structure LL1. The scan line LS3 is connected to the scan line LS4 through the electrical connection structure LL2. Similarly, the scan line LS(m−1) is connected to the scan line LSm through the electrical connection structure LLp. The driving circuit 210 provides the scanning signal SS1 to the scan line LS1. Thus, the scan lines LS1 and LS2 transmit the same scanning signal SS1 to corresponding switches of two rows. The driving circuit 210 provides a scanning signal SS3 to the scan line LS3. Thus, the scan lines LS3 and LS4 transmit the same scanning signal SS3 to corresponding switches of two rows. Similarly, the driving circuit 210 provides a scanning signal SS(m−1) to the scan line LS(m−1). Thus, the scan lines LS(m−1) and LSm transmit the same scanning signal SS(m−1) to corresponding switches of two rows.

For example, in the first time period, the first row of the unit circuit UC and the second row of the unit circuit UC operates the corresponding modulator AU by using the received data signal according to the scanning signal SS1. In the second time period, the third row of the unit circuit UC and the fourth row of the unit circuit UC operates the corresponding modulator AU by using the received data signal according to the scanning signal SS3, and so on.

In some embodiments, the scan line LS1 is connected to the scan line LS2 through the electrical connection structure LL1. The scan line LS2 is connected to the scan line LS3 through the electrical connection structure LL2. In other words, the scan lines LS1, LS2, and LS3 may be connected to each other through the electrical connection structure LL1. Thus, in the first time period, the first row of the unit circuit UC, the second row of the unit circuit UC, and the third row of the unit circuit UC operates the corresponding modulator AU by using the received data signal according to the scanning signal SS1.

It is worth mentioning that the driving circuit 210 drives the switches of more than two rows within a time period. Under the short frame time operation, the charging time of the scan lines LS1~LSm of the modulating device 200 may be extended by 2 times. In this way, the charging of the scan lines LS1~LSm does not need to be accelerated. The amount of the data lines LD1~LDn does not need to be increased. In addition, the design and process of the modulating device 200 do not need to be substantially modified as well.

Taking this embodiment as an example, two scan lines connected to one of the electrical connection structures LL1~LLp are adjacent to each other. For example, the scan lines LS1 and LS2 connected to the electrical connection structure LL1 are adjacent to each other. The present disclosure is not limited thereto. In some embodiments, two scan lines connected to one of the electrical connection structures LL1~LLp are not adjacent to each other.

In some embodiments, the switch SWU coupled to the same scan line in the scan lines LS1~LSm may be disposed in different rows. For example, an odd column switch SWU coupled to the scan line LS1 is located in the first row. An even column switch SWU coupled to the scan line LS1 is located in the second row, and the disclosure is not limited thereto.

Figure 4A:
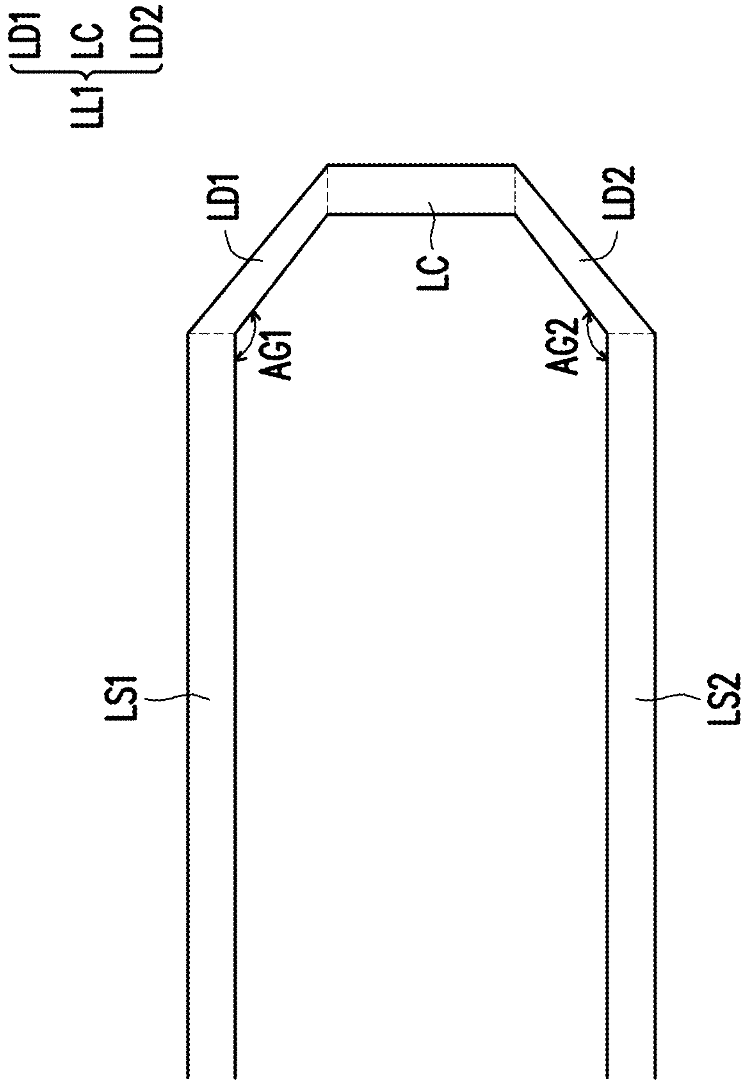
FIG. 4A is a schematic diagram of the electrical connection structure in FIG. 3.

Next, an example is given to illustrate the implementation of the electrical connection structure. First, FIG. 4A is a schematic diagram of the electrical connection structure in FIG. 3, referring to FIG. 4A, in this embodiment, the electrical connection structure LL1 is connected between scan lines LS1 and LS2. The electrical connection structure LL1 includes a first bend LD1, a second bend LD2, and a connection line LC. The first bend LD1 is connected to the scan line LS1. The second bend LD2 is connected to the scan line LS2. In other words, the electrical connection structure LL1 has the first bend LD1 at a connection position with the scan line LS1. The electrical connection structure LL1 has the second bend LD2 at a connection position with the scan line LS2. The connection line LC is connected between the first bend LD1 and the second bend LD2. In this embodiment, an angle AG1 between the first bend LD1 and the scan line LS1 is an obtuse angle. An angle AG2 between the second bend LD2 and the scan line LS2 is an obtuse angle. Thus, the first bend LD1 reduces the risk of corona discharge in the connection position between the electrical connection structure LL1 and the scan line LS1. The second bend LD2 reduces the risk of corona discharge in the connection position between the electrical connection structure LL1 and the scan line LS2.

Figure 4B:
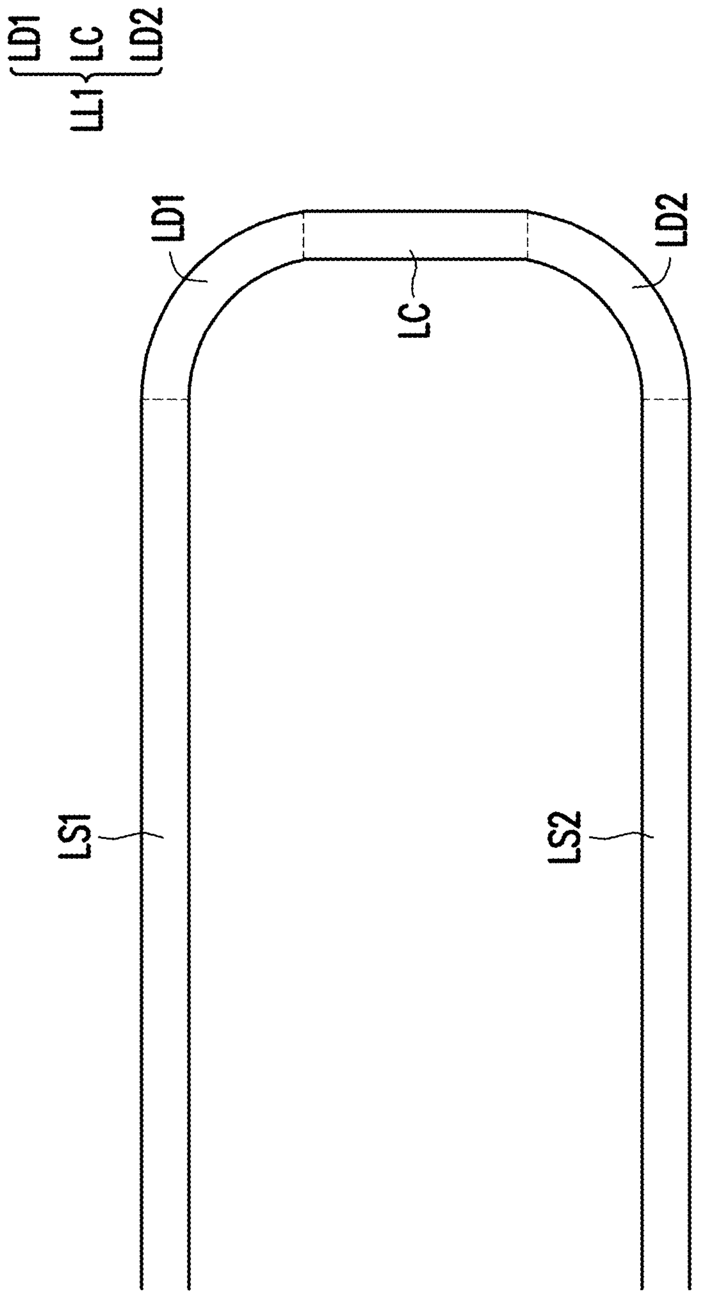
FIG. 4B is a schematic diagram of the electrical connection structure in FIG. 3.

FIG. 4B is a schematic diagram of the electrical connection structure in FIG. 3, referring to FIG. 4B in this embodiment, the electrical connection structure LL1 is connected between the scan lines LS1 and LS2. The electrical connection structure LL1 includes a first bend LD1, a second bend LD2, and a connection line LC. The first bend LD1 is connected to the scan line LS1. The second bend LD2 is connected to the scan line LS2. The connection line LC is connected between the first bend LD1 and the second bend LD2. In this embodiment, the shape of the first bend LD1 is any arc. The shape of the second bend LD2 is any arc. Thus, the first bend LD1 reduces the risk of corona discharge in the connection position between the electrical connection structure LL1 and the scan line LS1. The second bend LD2 reduces the risk of corona discharge in the connection position between the electrical connection structure LL1 and the scan line LS2.

Figure 4C:
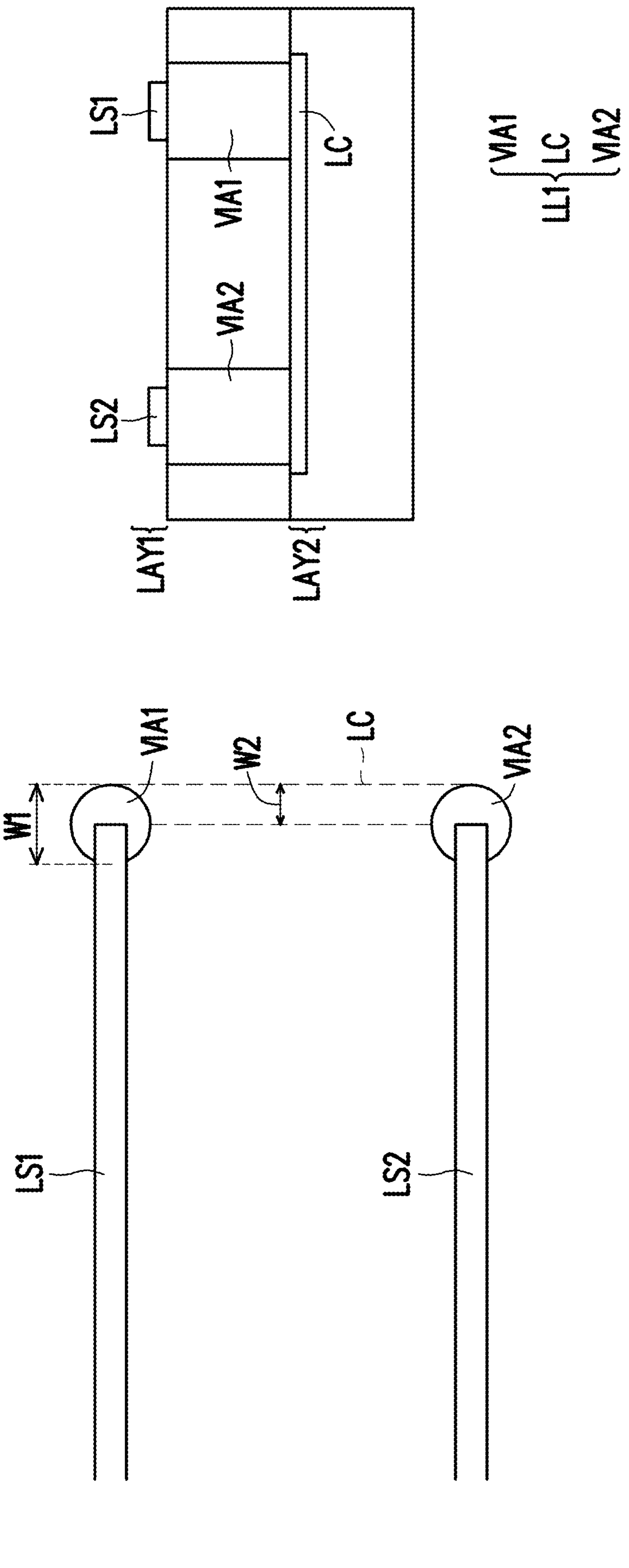
FIG. 4C is a schematic diagram of the electrical connection structure in FIG. 3.

FIG. 4C is a schematic diagram of the electrical connection structure in FIG. 3, referring to FIG. 4C, a top view and a cross-sectional view of the scan lines LS1 and LS2 and the electrical connection structure LL1 are shown in FIG. 4C. In this embodiment, the scan lines LS1 and LS2 are disposed on a first layer LAY1 on the substrate SB. The electrical connection structure LL1 includes the connection line LC, a first via VIA1, and a second via VIA2. The connection line LC is disposed on a second layer LAY2 of the substrate SB. The first via VIA1 is connected between the scan line LS1 and a first end of the connection line LC. The second via VIA2 is connected between the scan line LS2 and a second end of the connection line LC.

In this embodiment, the first via VIA1 and the second via VIA2 have a width (also known as, diameter) W1. The connection line LC has a width W2. The width W1 is greater than the width W2. In this way, the risk of layout mismatch between the scan lines LS1 and LS2 and the connection line LC may be reduced.

The first via VIA1 reduces the risk of corona discharge in the connection position between the electrical connection structure LL1 and the scan line LS1. The second via VIA2 reduces the risk of corona discharge in the connection position between the electrical connection structure LL1 and the scan line LS2.

Figure 5:
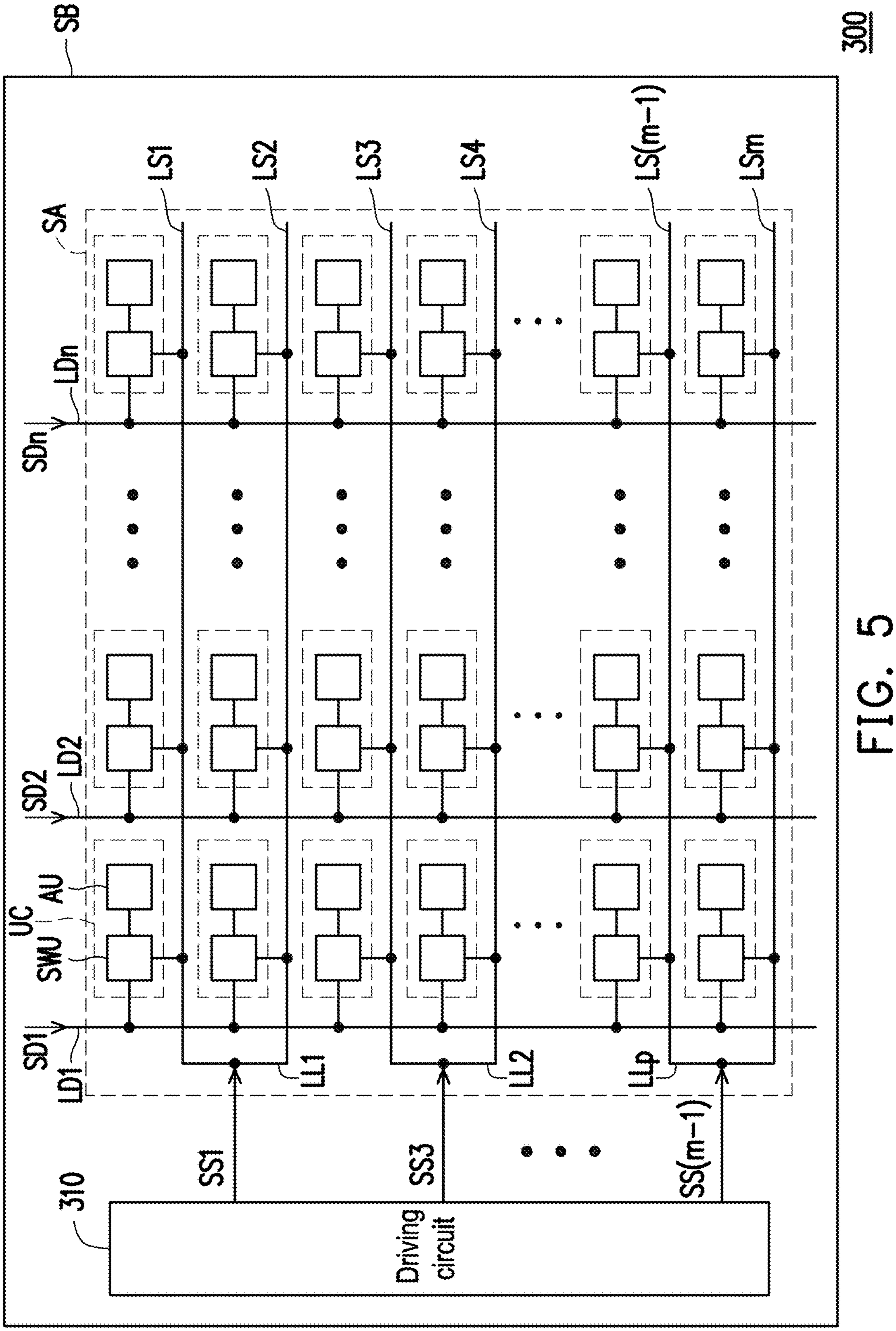
FIG. 5 is a schematic diagram of a modulating device according to the third embodiment of the disclosure.

FIG. 5 is a schematic diagram of a modulating device according to the third embodiment of the disclosure, referring to FIG. 5, in this embodiment, a modulating device 300 includes a substrate SB, multiple unit circuits UC, a driving circuit 310, scan lines LS1~LSm, and data lines LD1~LDn. Each of the modulators AU corresponds to each of the switches SWU. Each of the switches SWU and a corresponding modulator AU may form a unit circuit UC. The unit circuit UC is arranged in an active area SA in multiple rows and columns. In some embodiments, the unit circuit UC may be implemented by the unit circuit UC' shown in FIG. 2.

The scan lines LS1~LSm and the data lines LD1~LDn are disposed in the substrate SB. The first row of the unit circuit UC is connected to the scan line LS1 to receive a scanning signal SS1. The second row of the unit circuit UC is connected to the scan line LS2 to receive the scanning signal SS1. In other words, the scan lines LS1 and LS2 in the scan lines LS1~LSm transmit the same scanning signal SS1 to the switches of more than two rows among the switches SWU. The third row of the unit circuit UC is connected to the scan line LS3 to receive a scanning signal SS3. The fourth row of the unit circuit UC is connected to the scan line LS4 to receive the scanning signal SS3. In other words, the scan lines LS3 and LS4 transmit the same scanning signal SS3 to the switches of more than two rows among the switches SWU. The first column of the unit circuit UC is connected to the data line LD1 to receive a data signal SD1. The second column of the unit circuit UC is connected to the data line LD2 to receive a data signal SD2, and so on.

In this embodiment, the driving circuit 310 is disposed on the substrate SB. The driving circuit 310 drives the switches SWU. The driving circuit 310 drives switches of two rows among the switches SWU within a time period. In this embodiment, the driving circuit 310 simultaneously provides the same scanning signal to at least two scan lines in the scan lines LS1~LSm. For example, the driving circuit 310 simultaneously provides the scanning signal SS1 to the scan lines LS1 and LS2. The driving circuit 310 simultaneously provides the scanning signal SS3 to the scan lines LS3 and LS4. Similarly, the driving circuit 310 simultaneously provides the scanning signal SS(m−1) to the scan lines LS(m−1) and LSm.

Taking this embodiment as an example, the scan line LS1 has a scanning signal receiving end. The scan line LS2 has a scanning signal receiving end. The scanning signal receiving end of the scan line LS1 is connected to the scanning signal receiving end of the scan line LS2. The scan line LS3 has a scanning signal receiving end. The scan line LS4 has a scanning signal receiving end. The scanning signal receiving end of the scan line LS3 is connected to the scanning signal receiving end of the scan line LS4, and so on.

Taking this embodiment as an example, the modulating device 300 further includes electrical connection structures LL1~LLp. The scan line LS1 is connected to the scan line LS2 through the electrical connection structure LL1. The scan line LS3 is connected to the scan line LS4 through the electrical connection structure LL2, and so on. The electrical connection structures LL1~LLp may be respectively implemented by one of FIG. 4A, FIG. 4B, and FIG. 4C.

Taking this embodiment as an example, at least two scan lines that simultaneously receive the same scanning signal are adjacent to each other. For example, the scan lines LS1 and LS2 that simultaneously receive the scanning signal SS1 are adjacent to each other. The disclosure is not limited thereto. In some embodiments, at least two scan lines simultaneously receive the same scanning signal are not adjacent to each other.

Figure 6:
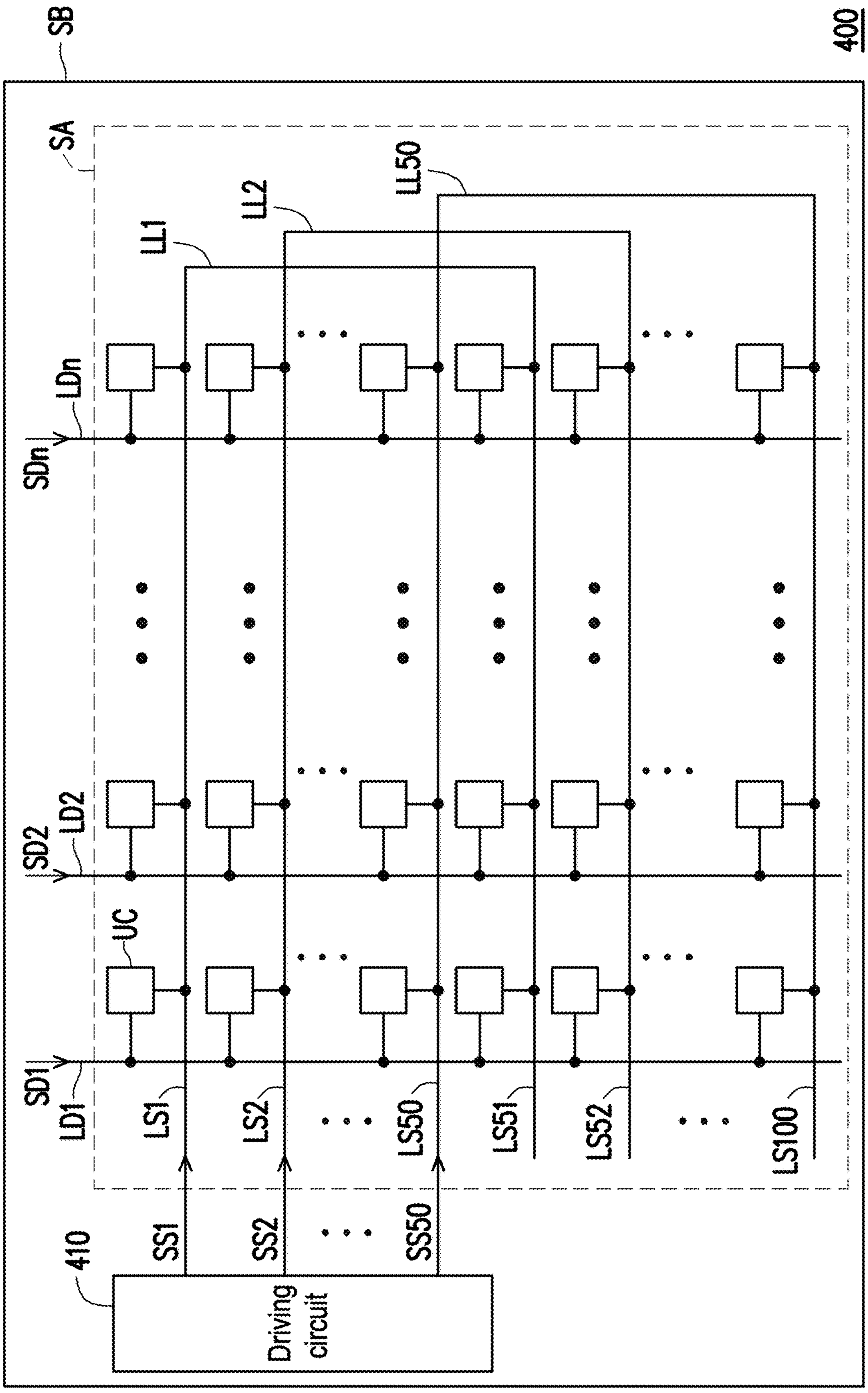
FIG. 6 is a schematic diagram of a modulating device according to the fourth embodiment of the disclosure.

FIG. 6 is a schematic diagram of a modulating device according to the fourth embodiment of the disclosure, referring to FIG. 6, in this embodiment, the modulating device 400 includes a substrate SB, multiple unit circuits UC, a driving circuit 410, scan lines LS1~LSm, data lines LD1~LDn, and electrical connection structures LL1~LLp. The implementation of the unit circuits UC, the scan lines LS1~LSm, and the data lines LD1~LDn has been clearly described at least in the embodiment of FIG. 3, so it will not be repeated herein. In some embodiments, the unit circuit UC may be implemented by the unit circuit UC' shown in FIG. 2.

In this embodiment, "m" is 100 for example (the disclosure is not limited thereto). "p" is 50 for example (the disclosure is not limited thereto). In this embodiment, the electrical connection structure LL1 is connected to the scan lines LS1 and LS51. The scan lines LS1 and LS51 are not adjacent to each other. The electrical connection structure LL2 is connected to the scan lines LS2 and LS52. The scan lines LS2 and LS52 are not adjacent to each other. Similarly, the electrical connection structure LL50 is connected to the scan lines LS50 and LS100. The scan lines LS50 and LS100 are not adjacent to each other.

In this embodiment, the electrical connection structures LL1~LL50 may be respectively implemented by one of FIG. 4A, FIG. 4B, and FIG. 4C.

Figure 7:
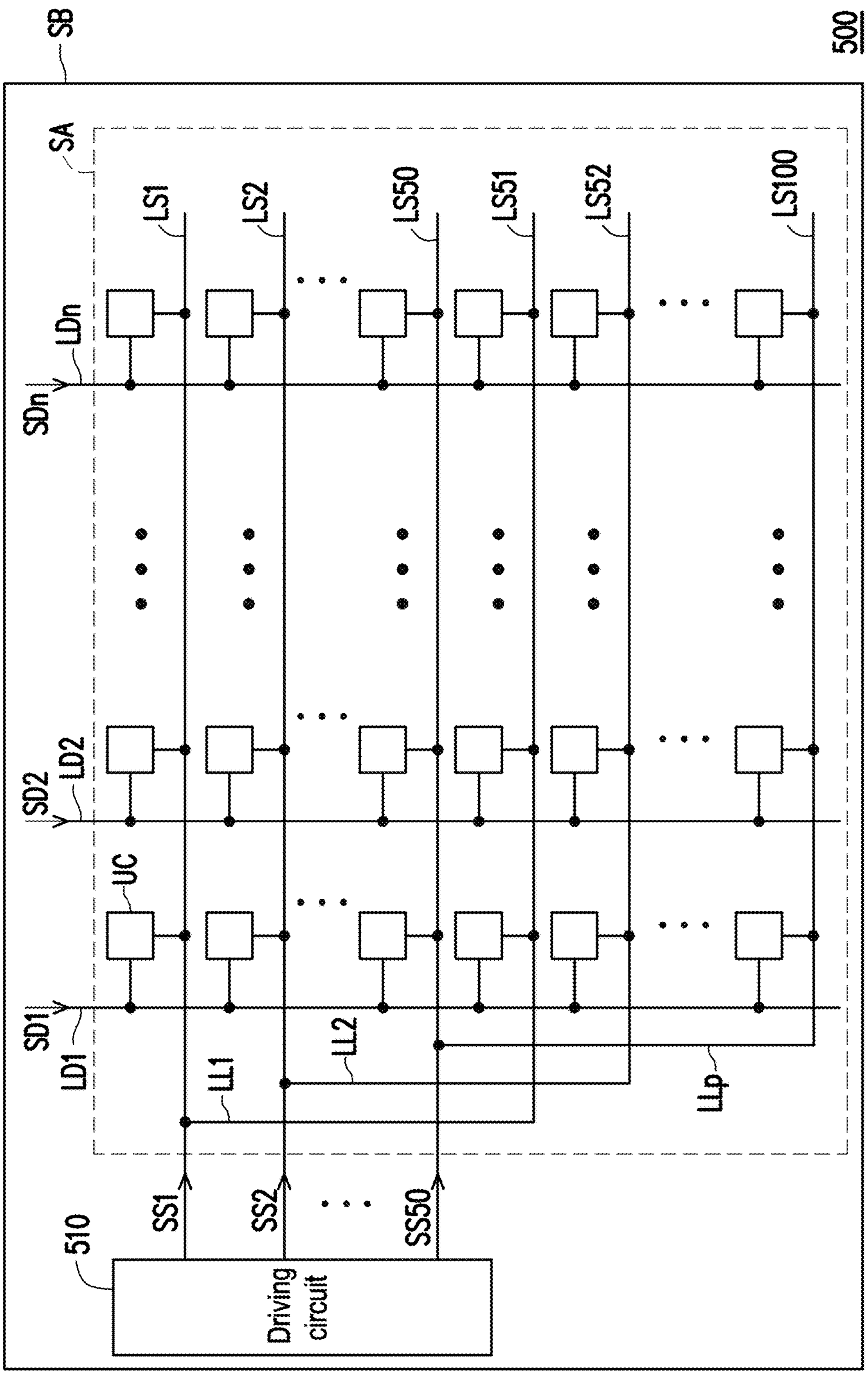
FIG. 7 is a schematic diagram of a modulating device according to the fifth embodiment of the disclosure.

FIG. 7 is a schematic diagram of a modulating device according to the fifth embodiment of the disclosure, referring to FIG. 7, in this embodiment, the modulating device 500 includes a substrate SB, multiple unit circuits UC, a driving circuit 510, scan lines LS1~LSm, and data lines LD1~LDn. The implementation of the unit circuits UC, the scan lines LS1~LSm, and the data lines LD1~LDn has been clearly described at least in the embodiment of FIG. 5, so it will not be repeated herein. In some embodiments, the unit circuit UC may be implemented by the unit circuit UC' shown in FIG. 2.

In this embodiment, "m" is 100 for example (the disclosure is not limited thereto). "p" is 50 for example (the disclosure is not limited thereto). In this embodiment, the scan lines LS1 and LS51 simultaneously receive the scanning signal SS1. The scan lines LS1 and LS51 are not adjacent to each other. The scan lines LS2 and LS52 simultaneously receive the scanning signal SS2. The scan lines LS2 and LS52 are not adjacent to each other. The scan lines LS50 and LS100 simultaneously receive the scanning signal SS50. The scan lines LS50 and LS100 are not adjacent to each other.

Taking this embodiment as an example, the scan line LS1 has a scanning signal receiving end. The scan line LS51 has a scanning signal receiving end. The scanning signal receiving end of the scan line LS1 is connected to the scanning signal receiving end of the scan line LS51. The scan line LS2 has a scanning signal receiving end. The scan line LS52 has a scanning signal receiving end. The scanning signal receiving end of the scan line LS2 is connected to the scanning signal receiving end of the scan line LS52, and so on.

Taking this embodiment as an example, the modulating device 500 further includes electrical connection structures LL1~LLp. The scanning signal receiving end of the scan line LS1 is connected to the scanning signal receiving end of the scan line LS51 through the electrical connection structure LL1. The scanning signal receiving end of the scan line LS2 is connected to the scanning signal receiving end of the scan line LS52 through the electrical connection structure LL2, and so on. The electrical connection structures LL1~LLp may be respectively implemented by one of FIG. 4A, FIG. 4B, and FIG. 4C.

Figure 8:
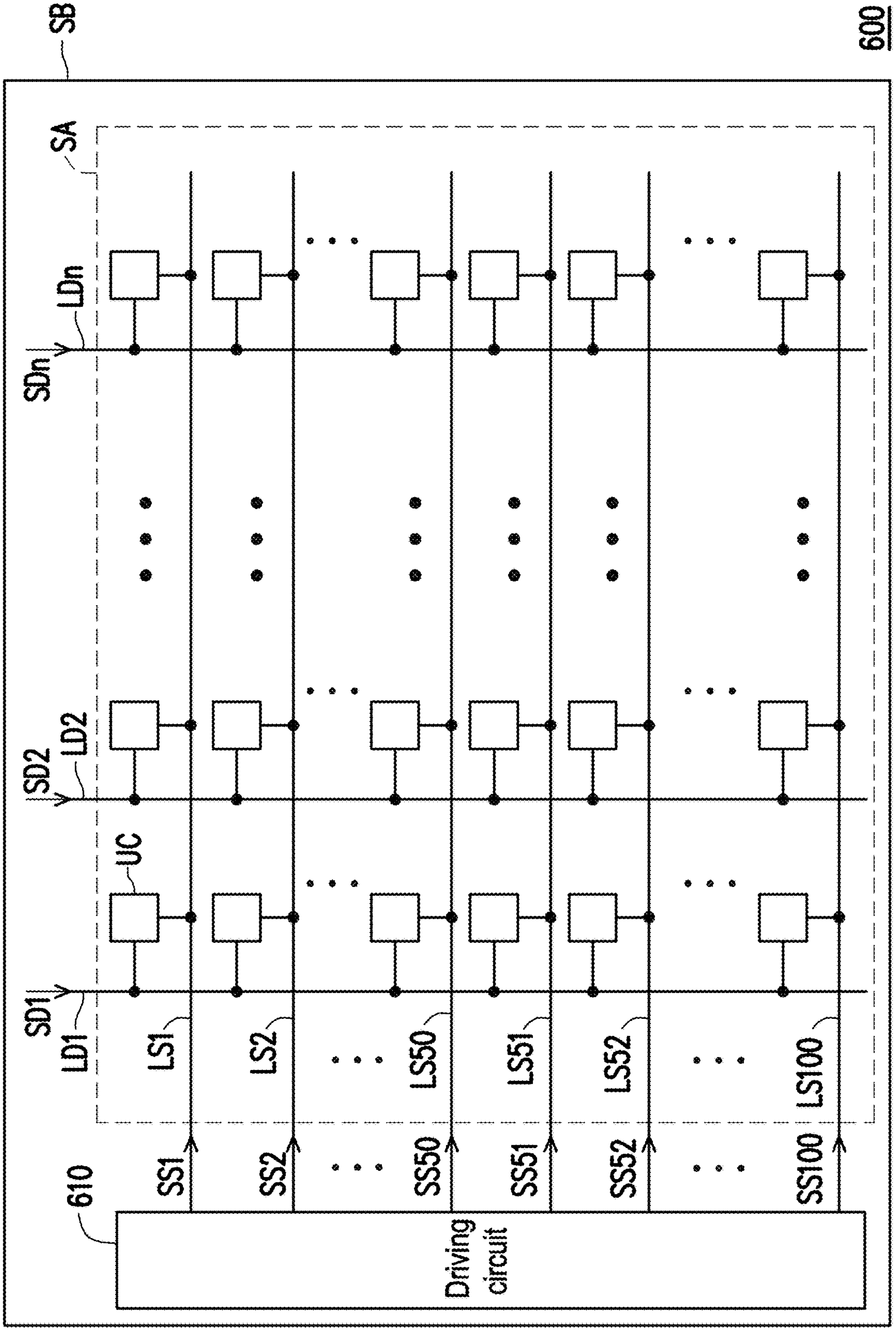
FIG. 8 is a schematic diagram of a modulating device according to the sixth embodiment of the disclosure.
Figure 9:
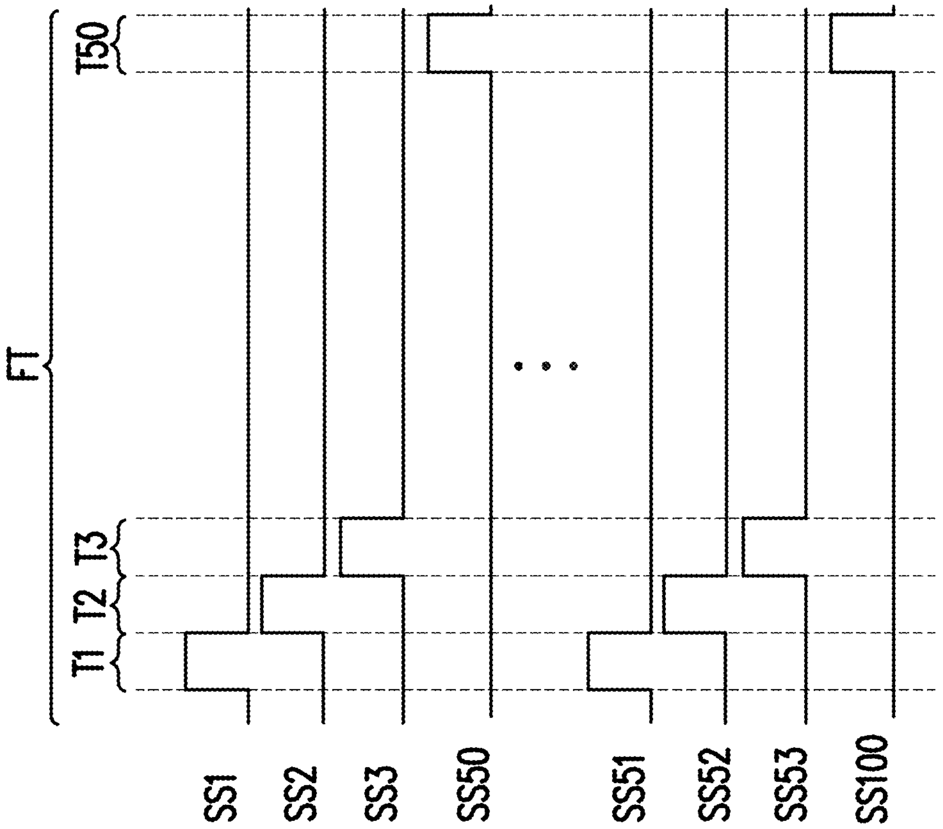
FIG. 9 is a time sequence diagram of the scanning signal in FIG. 8.

Referring to FIG. 8 and FIG. 9 at the same time, FIG. 8 is a schematic diagram of a modulating device according to the sixth embodiment of the disclosure, and FIG. 9 is a time sequence diagram of the scanning signal in FIG. 8. In this embodiment, the modulating device 600 includes a substrate SB, multiple unit circuits UC, a driving circuit 610, scan lines LS1~LSm, and data lines LD1~LDn. The implementation of the unit circuits UC, the scan lines LS1~LSm, and the data lines LD1~LDn has been clearly described at least in the embodiment of FIG. 1, so it will not be repeated herein. In some embodiments, the unit circuit UC may be implemented by the unit circuit UC' shown in FIG. 2.

In this embodiment, the driving circuit 610 is a driving integrated circuit. The driving circuit 610 provides scanning signals SS1~SSm. In the same frame time FT, the time sequences of at least two scanning signals among the scanning signals SS1~SSm are identical to each other. In other words, the waveform changes of at least two scanning signals among the scanning signals SS1~SSm are identical to each other. Furthermore, in this embodiment, in the same frame time FT, the waveform changes of the scanning signals SS1~SSm are the same in pairs.

Taking this embodiment as an example, "m" is 100 (the disclosure is not limited thereto). The driving circuit 610 provides the scanning signals SS1~SS100. The driving circuit 610 provides the scanning signal SS1 to the scan line LS1. The driving circuit 610 provides the scanning signal SS2 to the scan line LS2. Similarly, the driving circuit 610 provides the scanning signal SS100 to the scan line LS100. For example, in the same frame time FT, the time sequences of the scanning signals SS1 and SS51 are identical to each other. The time sequences of the scanning signals SS2 and SS52 are identical to each other. The time sequences of the scanning signals SS50 and SS100 are identical to each other. For example, the frame time FT includes time periods T1~T50. At the time period T1, the scanning signals SS1 and SS51 have pulse waves (e.g., positive pulse waves). At the time period T2 after the time period T1, the scanning signals SS2 and SS52 have pulse waves. At the time period T3 after the time period T2, the scanning signals SS3 and SS53 have pulse waves, and so on. At the time period T50, the scanning signals SS50 and SS100 have pulse waves, and so on.

To sum up, the driving circuit drives switches of more than two rows within a time period. Under the short frame time operation, the charging time of the signal channel (e.g., scan line) of the modulating device may be extended at least by 2 times. In this way, the charging of the signal channel does not need to be accelerated. The design and process of the modulating device do not need to be substantially modified. The design cost and manufacturing cost of the modulating device adapted for short frame time does not increase significantly.

Finally, it should be noted that the foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments can still be modified, or parts or all of the technical features thereof can be equivalently replaced; however, these modifications or substitutions do not deviate the essence of the corresponding technical solutions from the scope of the technical solutions of the embodiments of the disclosure.

What is claimed is:

1. A modulating device, comprising:
a substrate having a surface;
a plurality of modulators, disposed on the surface of the substrate;
a plurality of switches, disposed on the surface of the substrate, wherein each of the modulators corresponds to each of the switches;
a driving circuit, disposed on the surface of the substrate and configured to drive the switches,
wherein the driving circuit drives switches of more than two rows among the plurality of switches within a time period,
wherein each of the modulators comprises a pixel circuit and a working element,
wherein the pixel circuit is electrically connected to the working element,
wherein the working element is a varactor;
a plurality of scan lines disposed on the surface of the substrate, and connected to the driving circuit, wherein the plurality of scan lines comprise a first scan line, a second scan line, and a plurality of third scan lines,
wherein the first scan line and the second scan line transmit a first scanning signal to switches of two rows among the plurality of switches, and
wherein the first scan line and the second scan line which transmit the same first scanning signal are separated by the plurality of third scan lines, and the plurality of third scan lines receive a plurality of scanning signals respectively different from the first scanning signal; and
an electrical connection structure, disposed on the surface of the substrate,
wherein the first scan line is connected to the second scan line through the electrical connection structure,
wherein the electrical connection structure comprises:
a connection line,
a first via, connected between the first scan line and a first end of the connection line, and
a second via, connected between the second scan line and a second end of the connection line,
wherein in a top view, the first via has a first width along a first direction parallel to the surface of the substrate, the connection line has a second width along the first direction, and the first width is greater than the second width.

2. The modulating device according to claim 1, wherein:
the modulating device further comprises a plurality of data lines,
each of the switches comprises a first end, a second end, and a control end,
the first end is connected to a corresponding data line in the data lines,
the second end is connected to a corresponding modulator in the modulators, and
the control end is connected to a corresponding scan line in the scan lines.

3. The modulating device according to claim 1, wherein the pixel circuit comprises at least one of an amplifier circuit, a compensation circuit, and a source follower circuit.

4. The modulating device according to claim 1, wherein each of the modulators further comprises:
a capacitor, electrically connected to the working element.

5. The modulating device according to claim 1, wherein in the top view, the electrical connection structure has a first bend at a connection position with the first scan line, and a second bend at a connection position with the second scan line.

6. The modulating device according to claim 5, wherein:
an angle between the first bend and the first scan line is an obtuse angle, and
an angle between the second bend and the second scan line is an obtuse angle.

7. The modulating device according to claim 1,
wherein in the top view, the electrical connection structure has a first bend at a connection position with the first scan line, and a second bend at a connection position with the second scan line,
wherein:
a shape of the first bend is an arc, and
a shape of the second bend is an arc.

8. The modulating device according to claim 1, wherein the first scan line and the second scan line are parallel and extend along the first direction, and at least a portion of the connection line extends along a second direction different from the first direction.

* * * * *